United States Patent
Skriba

(10) Patent No.: US 10,752,827 B2
(45) Date of Patent: Aug. 25, 2020

(54) CLAY INHIBITORS FOR DRILLING, FRACTURING, AND OTHER PROCEDURES

(71) Applicant: INGEVITY SOUTH CAROLINA, LLC, North Charleston, SC (US)

(72) Inventor: Michael J. Skriba, Charleston, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 16/302,633

(22) PCT Filed: May 17, 2017

(86) PCT No.: PCT/US2017/032999
§ 371 (c)(1),
(2) Date: Nov. 17, 2018

(87) PCT Pub. No.: WO2017/201109
PCT Pub. Date: Nov. 23, 2017

(65) Prior Publication Data
US 2019/0316030 A1    Oct. 17, 2019

Related U.S. Application Data

(60) Provisional application No. 62/338,242, filed on May 18, 2016.

(51) Int. Cl.
*C09K 8/60* (2006.01)
*C09K 8/035* (2006.01)
*C09K 8/68* (2006.01)
*E21B 21/00* (2006.01)
*E21B 43/26* (2006.01)

(52) U.S. Cl.
CPC ............. *C09K 8/608* (2013.01); *C09K 8/035* (2013.01); *C09K 8/68* (2013.01); *E21B 21/00* (2013.01); *E21B 43/26* (2013.01); *C09K 2208/12* (2013.01)

(58) Field of Classification Search
None
See application file for complete search history.

(56) References Cited

U.S. PATENT DOCUMENTS

2009/0065736 A1    3/2009  Johnson
2016/0137901 A1*   5/2016  Bickford .................. C09K 8/06
                                                    166/308.2

FOREIGN PATENT DOCUMENTS

WO    WO 1989/011516    11/1989
WO    WO 2014/186098    11/2014
WO    WO 2014/200671    12/2014

* cited by examiner

*Primary Examiner* — John J Figueroa
(74) *Attorney, Agent, or Firm* — Bryan D. Zerhusen, Esq.; Nicholas R. Herrel, Esq.; Cantor Colburn LLP

(57) ABSTRACT

Reaction products produced by mixing a maleated tall oil fatty acid and/or a maleated soy oil fatty acid/DETA component with an amine or amine bottom preparation are used as clay inhibitors in drilling fluids and in hydraulic fracturing fluids for drilling wells and for fracturing subterranean formations, and are also used as clay inhibitors in other treatment fluids for treating wells or subterranean formations.

24 Claims, No Drawings

CLAY INHIBITORS FOR DRILLING, FRACTURING, AND OTHER PROCEDURES

CROSS-REFERENCE TO RELATED APPLICATIONS

This application claims priority to U.S. Patent Application No. 62/338,242, filed 18 May 2016 and entitled CLAY INHIBITORS FOR DRILLING, FRACTURING, AND OTHER PROCEDURES, the contents of which is incorporated herein by reference in its entirety for all purposes.

BACKGROUND

1. Field of the Discovery

The present disclosure relates to compositions for inhibiting clay swelling and to the use of the same in drilling, fracturing, and other procedures.

2. Background Information

Water-based drilling fluids (muds) typically comprise a mixture of water and clay (e.g., bentonite) and also commonly include clay inhibitors and/or other chemicals. The drilling fluid is circulated through the well bore during drilling in order to lubricate and cool the drill bit, flush the cuttings out of the well, and strengthen the sides of the hole to prevent cave-ins. Typically, the drilling fluid is delivered downwardly into the well through the drill string and then returns upwardly through the annulus formed between the drill string and wall of the borehole.

Hydraulic fracturing fluids typically comprise water and sand, or other proppant materials, and also commonly include various types of chemical additives. Examples of such additives include: gelling agents, which assist in suspending the proppant material; crosslinkers, which help to maintain fluid viscosity at increased temperatures; gel breakers, which operate to break the gel suspension after the fracture is formed and the proppant is in place; friction reducers; clay inhibitors; corrosion inhibitors; scale inhibitors; acids; surfactants; antimicrobial agents; and others. The hydraulic fracturing fluid is pumped into the subterranean formation under sufficient pressure to create, expand, and/or extend fractures in the formation and to thus provide enhanced recovery of the formation fluid.

Shale formations are rich in clay content. They are horizontally drilled and then hydraulically fractured in multiple stages. Clay is by nature hydrophilic and in the presence of water it tends to absorb water and swell. In some cases it may even disintegrate. During the drilling process, this may cause the hole to cave or cause the drilling cuttings to disintegrate into fines, which cannot be removed easily on the surface from the drilling fluid. During hydraulic fracturing, clay swelling may negatively affect production due to formation embedment in the proppant pack.

Thus, a need exists in the art for improved chemical formulations that are effective for inhibiting clay swelling, particularly when conducting drilling, fracturing, or other operations in shale formations.

SUMMARY

The present description provides clay inhibitor compositions, which are well suited for use in drilling and fracturing fluids and procedures of the type described above. The composition is surprisingly and unexpectedly effective for inhibiting clay swelling and has a desirably low toxicity level. The inhibitor compositions of the present disclosure are therefore particularly effective for use in drilling and fracturing shale formations. The described inhibitor composition is also well suited for use in other fluids and operations for treating wells or subterranean formations. Examples include, but are not limited to, completion fluids, water, polymer, surfactant, surfactant/polymer flood fluids, conformance control fluids, workover or other well treatment fluids.

Thus, in one aspect, the description provides a clay inhibitor composition for fluids used in drilling, fracturing, or treating wells and subterranean formations comprising:
  a. a reaction product produced by reacting a maleated fatty acid material with diethylenetriamine (DETA), wherein said maleated fatty acid material is maleated tall oil fatty acid, maleated soy oil fatty acid, or a combination thereof; and
  b. at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

In any of the aspects or embodiments described herein, the amine or combination of amines in the clay inhibitor composition comprises from about 1% wt to about 25% wt of said clay inhibitor composition. In certain embodiments, the amine or combination of amines in the clay inhibitor composition comprises from about 5% wt to about 10% wt of said clay inhibitor composition. In certain additional embodiments, the amine in the clay inhibitor composition comprises at least one of amine HST, amine DCT or a combination thereof.

In certain embodiments, the maleated fatty acid material comprises maleated tall oil fatty acid. In additional embodiments, the maleated tall oil fatty acid comprises about 30% wt linoleic acid.

In an additional aspect, the description provides methods of drilling a well comprising the steps of circulating through a well bore a drilling fluid as described herein as the well is being drilled. In accordance with the present description, the drilling fluid includes an amount of an inhibitor composition (i.e., any of the clay inhibitor compositions presented herein) effective to at least reduce clay swelling occurring in the well as the drilling fluid is circulated through the well bore.

In another aspect, the description provides methods of fracturing a subterranean formation comprising injecting a fracturing fluid as described herein into the subterranean formation. In accordance with the present description, the fracturing fluid includes an amount of an inhibitor composition (i.e., any of the clay inhibitor compositions presented herein) effective to at least reduce clay swelling occurring in the subterranean formation when the fracturing fluid is injected.

In another aspect, the description provides methods of treating a well or a subterranean formation comprising injecting a treatment fluid as described herein into the well or the subterranean formation. In accordance with the present description, the treatment fluid includes an amount of an inhibitor composition (i.e., any of the clay inhibitor compositions presented herein) effective to at least reduce clay swelling occurring during injection.

Further aspects, features, and advantages of the present invention will be apparent to those of ordinary skill in the art upon examining the accompanying drawing and upon reading the following Detailed Description of the Preferred Embodiments.

DETAILED DESCRIPTION

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

The present description provides improved compositions and methods for drilling wells, fracturing subterranean formations, and other treatments. The drilling and fracturing compositions and methods of the present disclosure are particularly effective for use in shale formations but can also be used in generally any other type of formation.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the invention.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The terms "co-administration" and "co-administering" or "combination therapy" refer to both concurrent administration (administration of two or more therapeutic agents at the same time) and time varied administration (administration of one or more therapeutic agents at a time different from that of the administration of an additional therapeutic agent or agents), as long as the therapeutic agents are present in the patient to some extent, preferably at effective amounts, at the same time. In certain preferred aspects, one or more of the present compounds described herein, are co-administered in combination with at least one additional bioactive agent, especially including an anticancer agent. In particularly preferred aspects, the co-administration of compounds results in synergistic activity and/or therapy, including anti-cancer activity.

The compounds described herein, unless otherwise indicated, refers to any specific chemical compound disclosed herein and includes tautomers, regioisomers, geometric isomers, and where applicable, stereoisomers, including optical isomers (enantiomers) and other steroisomers (diastereomers) thereof, as well as pharmaceutically acceptable salts and derivatives (including prodrug forms) thereof where applicable, in context. Within its use in context, the term compound generally refers to a single compound, but also may include other compounds such as stereoisomers, regioisomers and/or optical isomers (including racemic mixtures) as well as specific enantiomers or enantiomerically enriched mixtures of disclosed compounds.

The term "effective" is used to describe an amount of a compound, composition or component which, when used within the context of its intended use, effects an intended result, e.g., reduce or inhibit clay swelling. The term effective subsumes all other effective amount or effective concentration terms, which are otherwise described or used in the present application.

In one aspect, the description provides a clay inhibitor composition for fluids used in drilling, fracturing, or treating wells and subterranean formations comprising:
  a. a reaction product produced by reacting a maleated fatty acid material with diethylenetriamine (DETA), wherein said maleated fatty acid material is maleated tall oil fatty acid, maleated soy oil fatty acid, or combination thereof; and
  b. at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

In any of the aspects or embodiments described herein, the amine or combination of amines in the clay inhibitor composition comprises from about 1% wt to about 25% wt of said clay inhibitor composition (including ranges therebetween). In any of the aspects or embodiments described herein, the amine or combination of amines in the clay inhibitor composition comprises about 1% wt, 2% wt, 3% wt, 4% wt, 5% wt, 6% wt, 7% wt, 8% wt, 9% wt, 10% wt, 11% wt, 12% wt, 13% wt, 14% wt, 15% wt, 16% wt, 17% wt, 18% wt, 19% wt, 20% wt, 21% wt, 22% wt, 23% wt, 24% wt, or about 25% wt of said clay inhibitor composition. In certain embodiments, the amine or combination of amines in the clay inhibitor composition comprises from about 5% wt to about 10% wt of said clay inhibitor composition.

In certain additional embodiments, the amine in the clay inhibitor composition comprises at least one of amine HST, amine DCT or a combination thereof.

In certain embodiments, the maleated fatty acid material comprises maleated tall oil fatty acid. In additional embodiments, the maleated tall oil fatty acid comprises at least about 30% wt linoleic acid. In additional embodiments, the maleated tall oil fatty acid comprises about 30% wt linoleic acid.

The maleated fatty acid material used for producing the inhibitor employed in the present disclosure will preferably be produced by the reaction of tall oil fatty acid, soy oil fatty acid, or a combination thereof with maleic anhydride. The tall oil fatty acid and/or soy oil fatty acid used for producing the inhibitor will preferably have a linoleic acid content of at least 30% by weight of the total weight of the tall oil and/or soy oil fatty acid material. The linoleic acid content of the tall oil and/or soy oil fatty acid material will more preferably be in the range of from about 35% to about 70% by weight of the tall oil and/or soy oil fatty acid material.

The linoleic acid present in the tall oil and/or soy oil fatty acid material will preferably be a conjugated linoleic acid, but can also be a non-conjugated acid if an iodine catalyst is used when reacting the fatty acid material with the maleic anhydride. Non-conjugated linoleic acid is converted to the conjugated form in the presence of the iodine. The conjugated linoleic acid reacts with the maleic anhydride to form an anhydride ring structure on the fatty acid. This anhydride subsequently reacts with diethylenetriamine (DETA) in the next stage of the reaction process to form the fatty acid/DETA component of the final inhibitor product. Therefore, higher linoleic acid content in the starting tall oil and/or soy oil fatty acid reactant material ensures a good reaction yield for the fatty acid/DETA component of the final inhibitor product.

By way of example, but not by way of limitation, one maleated tall oil fatty acid material (referred to in the Example below as maleated TOFA-1) which is preferred for use in the present disclosure may be produced by forming a reaction mixture comprising tall oil fatty acid, molten maleic anhydride, iodine, and glacial acetic acid and reacting the mixture at a temperature of from about 430° F. to about 480° F. and an elevated pressure (most preferably about 80 psig) for about one to three hours. The concentrations of the reaction system components, based upon the total weight of the reaction system mixture, will preferably be as follows:
  a. Tall oil fatty acid reactant 80-90% by weight
  b. Maleic anhydride reactant 10-20% by weight
  c. Iodine about 0.1% by weight
  d. Glacial acetic acid about 0.10-0.12% by weight By way of further example, but not by way of limitation, another maleated tall oil fatty acid material (referred to in the Example below as maleated TOFA-2) which is preferred for use in the present disclosure is preferably produced by forming a reaction mixture comprising tall oil fatty acid, molten maleic anhydride, and glacial acetic acid and reacting the mixture at a temperature of from about 400° F. to about 460° F. and an elevated pressure (most preferably about 80 psig) for about two to five hours. The concentrations of the reaction system components, based upon the total weight of the reaction system mixture, will preferably be as follows:
  a. Tall oil fatty acid reactant 70-80% by weight
  b. Maleic anhydride reactant 18-28% by weight
  c. Glacial acetic acid about 0.10-0.12% by weight In the next stage of the reaction process for producing the inhibitor product, the maleated fatty acid material is reacted with DETA to afford the fatty acid/DETA component of the final inhibitor product.

By way of example, but not by way of limitation, the second stage of the reaction process for producing the inhibitor product can be performed by the following steps. All percentages stated in this procedure are percentages by weight based upon the total weight of all of the components used in the reaction charge.
  a. Combining, with agitation, from about 40% to about 60% water with from about 10% to about 30% of DETA;

b. Adding, with agitation, from about 20% to about 40% of the maleated fatty acid reactant material to the mixture to form the total reaction charge; and c. Reacting the reaction charge at from about 140° F. to about 200° F., typically about 3 hours, to produce the fatty acid/DETA component of the inhibitor product.

In the next stage of the process, the fatty acid/DETA component is mixed with at least one of the amines selected from the group consisting of diethylenetriamine (DETA); triethylenetetramine (TETA); tetraethylenepentamine (TEPA); heptaethyleneoctamine (HEOA); hexaethyleneheptamine (HEHA); amine HST; amine DCT; aminoethylpiperazine (AEP); dimethylaminopropylamine (DMAPA); aminoethylethanolamine (AEEA); diethanolamine (DEA); and triethanolamine (TEA). In another aspect, the at least one of the amines is amine HST or amine DCT, or a combination thereof. In another aspect, the at least one of the amines comprises about 1-25% of said clay inhibitor composition. In another aspect, the at least one of the amines comprises about 5-10% of said clay inhibitor composition.

The presence of water in the reaction charge operates to prevent the formation of amides in the reaction product and also reduces the viscosity of the final inhibitor product. In this regard, the inhibitor composition which is added to a drilling fluid, a fracturing fluid, or other treatment fluid in accordance with the present disclosure will preferably be in the form of an aqueous dilution comprising about 50% by weight of the active inhibitor and about 50% by weight water.

In an additional aspect, the description provides methods of drilling a well comprising the steps of circulating through a well bore a drilling fluid as described herein as the well is being drilled. In accordance with the present description, the drilling fluid includes an amount of an inhibitor composition (i.e., any of the clay inhibitor compositions presented herein) effective to at least reduce clay swelling occurring in the well as the drilling fluid is circulated through the well bore. In certain embodiments, the inhibitor composition is included in an amount in the range of from about 0.05% wt to about 5% wt, from about 0.1% wt to about 4.5% wt, from about 0.5% wt to about 4% wt, from about 1% wt to about 3.5% wt of the drilling fluid (including all ranges therebetween). In certain embodiments, the inhibitor composition is included in an amount of from about 2% to about 4% by weight, based upon the total weight of the drilling fluid.

In another aspect, the description provides methods of fracturing a subterranean formation comprising injecting a fracturing fluid as described herein into the subterranean formation. In accordance with the present description, the fracturing fluid includes an amount of an inhibitor composition (i.e., any of the clay inhibitor compositions presented herein) effective to at least reduce clay swelling occurring in the subterranean formation when the fracturing fluid is injected. In certain embodiments, the inhibitor composition is included in an amount in the range of from about 0.05% to about 2% by weight. In still additional embodiment, the inhibitor composition is included in an amount in the range of from about 0.2% to about 0.7% by weight, based upon the total weight of the hydraulic fracturing fluid.

In another aspect, the description provides methods of treating a well or a subterranean formation comprising injecting a treatment fluid as described herein into the well or the subterranean formation. In accordance with the present description, the treatment fluid includes an amount of an inhibitor composition (i.e., any of the clay inhibitor compositions presented herein) effective to at least reduce clay swelling occurring during injection.

In any of the aspects or embodiments described herein, the clay swelling is reduced by 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%.

The following example is meant to illustrate, but in no way limit, the claimed invention.

Example 1

A maleated TOFA-1 composition was prepared as described above using 85.3 wt % tall oil fatty acid, 14.49 wt % maleic anhydride, 0.1 wt % iodine, and 0.11 wt % glacial acetic acid in the reaction mixture and holding the reaction mixture at a reaction temperature of about 465° F. for about 75 minutes.

A maleated TOFA-2 composition was prepared as described above using 76.21 wt % tall oil fatty acid, 23.68 wt % maleic anhydride, and 0.11 wt % glacial acetic acid in the reaction mixture and holding the reaction mixture at a reaction temperature of about 430° F. for four hours.

A maleated tall oil fatty acid reactant material was prepared by combining two parts by weight of the TOFA-1 composition with one part by weight of the TOFA-2 composition.

Specific Embodiments

According to an aspect, the present disclosure provides a clay inhibitor composition for fluids used in drilling, fracturing, or treating wells and subterranean formations. The clay inhibitor comprises: (a) a reaction product produced by reacting a maleated fatty acid material with diethylenetriamine (DETA), wherein said maleated fatty acid material is maleated tall oil fatty acid, maleated soy oil fatty acid, or combination thereof; and (b) at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

In any aspect or embodiment described herein, component (b) comprises from about 1% wt to about 25% wt of the clay inhibitor composition.

In any aspect or embodiment described herein, component (b) comprises from about 5% wt to about 10% wt of the clay inhibitor composition.

In any aspect or embodiment described herein, the maleated fatty acid material is maleated tall oil fatty acid.

In any aspect or embodiment described herein, the maleated tall oil fatty acid comprises about 30% linoleic acid.

In any aspect or embodiment described herein, component (b) comprises at least one of amine HST, amine DCT or a combination thereof.

According to a further aspect, the present disclosure provides a method of drilling a well comprising the step of circulating a drilling fluid through a well bore as the well bore is being drilled, wherein the drilling fluid comprises an amount of a clay inhibitor effective to at least reduce clay swelling occurring in the well as the drilling fluid is circulated through the well bore, wherein the clay inhibitor comprises: (a) a reaction product produced by reacting a maleated fatty acid material with diethylenetriamine (DETA), wherein said maleated fatty acid material is maleated tall oil fatty acid, maleated soy oil fatty acid, or combination thereof; and (b) at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

In any aspect or embodiment described herein, component (b) comprises from about 1% wt to about 25% wt of the clay swelling inhibitor composition.

In any aspect or embodiment described herein, component (b) comprises from about 5% wt to about 10% wt of the clay inhibitor composition.

In any aspect or embodiment described herein, the maleated fatty acid material is maleated tall oil fatty acid.

In any aspect or embodiment described herein, the maleated tall oil fatty acid comprises about 30% linoleic acid.

In any aspect or embodiment described herein, component (b) comprises at least one of amine HST, amine DCT or a combination thereof.

According to an additional aspect, the present disclosure provides a method of fracturing a subterranean formation comprising injecting a fracturing fluid into the subterranean formation, wherein the fracturing fluid is effective to at least reduce clay swelling in the subterranean formation when the fracturing fluid is injected, wherein the fracturing fluid comprises: (a) a reaction product produced by reacting a maleated fatty acid material with diethylenetriamine (DETA), wherein said maleated fatty acid material is maleated tall oil fatty acid, maleated soy oil fatty acid, or combination thereof; and (b) at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

According to yet a further aspect, the present disclosure provides a method of treating a well or subterranean formation comprising injecting into the well or subterranean formation a treatment fluid, wherein the treatment fluid is effective to at least reduce clay swelling in the well or subterranean formation when the treatment fluid is injected, and wherein the treatment fluid comprises: (a) a reaction product produced by reacting a maleated fatty acid material with diethylenetriamine (DETA), wherein said maleated fatty acid material is maleated tall oil fatty acid, maleated soy oil fatty acid, or combination thereof; and (b) at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

In any aspect or embodiment described herein, component (b) comprises from about 1% wt to about 25% wt of said clay inhibitor composition.

In any aspect or embodiment described herein, component (b) comprises from about 5% wt to about 10% wt of said clay inhibitor composition.

In any aspect or embodiment described herein, said maleated fatty acid material is maleated tall oil fatty acid.

In any aspect or embodiment described herein, said maleated tall oil fatty acid comprises about 30% linoleic acid.

In any aspect or embodiment described herein, component (b) comprises at least one of amine HST, amine DCT or a combination thereof.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A clay inhibitor composition for fluids used in drilling, fracturing, or treating wells and subterranean formations, said clay inhibitor comprising:
   a. a reaction product produced by reacting a maleated fatty acid material with diethylenetriamine (DETA), wherein said maleated fatty acid material is maleated tall oil fatty acid, maleated soy oil fatty acid, or combination thereof; and
   b. at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

2. The composition of claim 1, wherein component (b) comprises from about 1% wt to about 25% wt of the clay inhibitor composition.

3. The composition of claim 2, wherein the reaction product is produced with a reaction mixture that comprises: from about 40%wt to about 60%wt of DETA. and from about 20%wt to about 40%wt of maleated fatty acid reactant material.

4. The composition of claim 1, wherein component (b) comprises from about 5% wt to about 10% wt of the clay inhibitor composition.

5. The composition of claim 1, wherein at least one of:
   the maleated fatty acid material is maleated tall oil fatty acid;
   component (h) comprises at least one of amine HST, amine DCT or a combination thereof; or
   a combination thereof.

6. The composition of claim 1, wherein the maleated tall oil fatty acid comprises about 30% linoleic acid.

7. A method of drilling a well comprising the step of circulating a drilling fluid through a well bore as the well bore is being drilled, wherein the drilling fluid comprises an amount of a clay inhibitor effective to at least reduce clay swelling occurring in the well as the drilling fluid is circulated through the well bore, wherein the clay inhibitor comprises:

a. a reaction product produced by reacting a maleated fatty acid material with diethylenetriamine (DETA), wherein said maleated fatty acid material is maleated tall oil fatty acid, maleated soy oil fatty acid, or combination thereof; and b. at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

8. The method of claim 7, wherein component (b) comprises from about 1% wt to about 25% wt of the clay swelling inhibitor composition.

9. The method of claim 8, wherein the reaction product is produced with a reaction mixture that comprises: from about 40%wt to about 60% wt of DETA. and from about 20%wt to about 40%wt of maleated fatty acid reactant material.

10. The method of claim 7, wherein component (b) comprises from about 5% wt to about 10% wt of the clay inhibitor composition.

11. The method of claim 7, wherein at least one of:
the maleated fatty acid material is maleated tall oil fatty acid;
component (b) comprises al least one of amine HST, amine DCT or a combination thereof; or
a combination thereof.

12. The method of claim 7, wherein the maleated tall oil fatty acid comprises about 30% linoleic acid.

13. A method of fracturing a subterranean formation comprising injecting a fracturing fluid into the subterranean formation, wherein the fracturing fluid is effective to at least reduce clay swelling in the subterranean formation when the fracturing fluid is injected, wherein the fracturing fluid comprises:

a. a reaction product produced by reacting a maleated fatty acid material with diethylenetriamine (DETA), wherein said maleated fatty acid material is maleated tall oil fatty acid, maleated soy oil fatty acid, or combination thereof; and b. at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

14. The method of claim 13, wherein component (b) comprises from about 1% wt to about 25% wt of said clay inhibitor composition.

15. The method of claim 14, wherein the reaction product is produced with a reaction mixture that comprises: from about 40%wt to about 60% wt of DETA. and from about 20%wt to about 40%wt of maleated fatty acid reactant material.

16. The method of claim 13, wherein component (b) comprises from about 5% wt to about 10% wt of said clay inhibitor composition.

17. The method of claim 13, wherein at least one of:
said maleated fatty acid material is maleated tall oil fatty acid;
component (b) comprises al least one of amine HST, amine DCT or a combination thereof; or
a combination thereof.

18. The method of claim 13, wherein said maleated tall oil fatty acid comprises about 30% linoleic acid.

19. A method of treating a well or subterranean formation comprising injecting into the well or subterranean formation a treatment fluid, wherein the treatment fluid is effective to at least reduce clay swelling in the well or subterranean formation when the treatment fluid is injected, and wherein the treatment fluid comprises:

a. a reaction product produced by reacting a maleated fatty acid material with diethylenetriamine (DETA), wherein said maleated fatty acid material is maleated tall oil fatty acid, maleated soy oil fatty acid, or combination thereof; and b. at least one amine selected from the group consisting of diethylenetriamine (DETA), triethylenetetramine (TETA), tetraethylenepentamine (TEPA), heptaethyleneoctamine (HEOA), hexaethyleneheptamine (HEHA), amine HST, amine DCT, aminoethylpiperazine (AEP), dimethylaminopropylamine (DMAPA), aminoethylethanolamine (AEEA), diethanolamine (DEA), triethanolamine (TEA), and a combination thereof.

20. The method of claim 19, wherein component (b) comprises from about 1%wt to about 25%wt of said clay inhibitor composition.

21. The method of claim 20, wherein the reaction product is produced with a reaction mixture that comprises: from about 40%wt to about 60%wt of DETA, and from about 20%wt to about 40%wt of maleated fatty acid reactant material.

22. The method of claim 19, wherein component (b) comprises from about 5%wt to about 10%wt of said clay inhibitor composition.

23. The method of claim 19, wherein at least one of:
said maleated fatty acid material is maleated tall oil fatty acid;
component (b) comprises at least one of amine HST, amine DCT or a combination thereof; or
a combination thereof.

24. The method of claim 19, wherein said maleated tall oil fatty acid comprises about 30% linoleic acid.

* * * * *